US008844466B2

(12) United States Patent
Vermeegen

(10) Patent No.: US 8,844,466 B2
(45) Date of Patent: Sep. 30, 2014

(54) PET FEEDING SYSTEM

(71) Applicant: Karin Vermeegen, Palm Beach Gardens, FL (US)

(72) Inventor: Karin Vermeegen, Palm Beach Gardens, FL (US)

( * ) Notice: Subject to any disclaimer, the term of this patent is extended or adjusted under 35 U.S.C. 154(b) by 0 days.

(21) Appl. No.: 13/971,034

(22) Filed: Aug. 20, 2013

(65) Prior Publication Data

US 2013/0333623 A1    Dec. 19, 2013

Related U.S. Application Data

(63) Continuation of application No. 13/165,519, filed on Jun. 21, 2011, now Pat. No. 8,534,225.

(60) Provisional application No. 61/356,807, filed on Jun. 21, 2010.

(51) Int. Cl.
*A01K 5/01* (2006.01)

(52) U.S. Cl.
USPC .......................................... 119/51.5; 119/421

(58) Field of Classification Search
USPC ................. 119/51.5, 416, 417, 421, 422, 702
See application file for complete search history.

(56) References Cited

U.S. PATENT DOCUMENTS

| | | |
|---|---|---|
| 3,260,236 A | 7/1966 | Jones |
| 3,516,389 A | 6/1970 | Meyer |
| D219,466 S | 12/1970 | Miller |
| 3,811,676 A | 5/1974 | Greenberg |
| 3,857,364 A | 12/1974 | Miller, Jr. |
| 4,055,341 A | 10/1977 | Martinez |
| D268,351 S | 3/1983 | Steinberg |
| D268,352 S | 3/1983 | Steinberg |
| 4,542,713 A | 9/1985 | Hansen |
| 4,667,960 A | 5/1987 | Stefanini |
| 4,677,938 A | 7/1987 | Tominaga |
| 4,718,017 A | 1/1988 | Hutton et al. |
| 4,841,911 A | 6/1989 | Houghton |
| 4,953,502 A | 9/1990 | Hoover |
| D379,381 S | 5/1997 | Hermes |
| 5,709,165 A | 1/1998 | Nurmikko |
| 5,971,830 A | 10/1999 | Tobin |
| 6,230,501 B1 | 5/2001 | Bailey et al. |
| 6,837,184 B2 | 1/2005 | Gondhalekar et al. |
| D652,447 S | 1/2012 | Knox, Jr. |
| 2006/0157554 A1 | 7/2006 | Halbur et al. |

OTHER PUBLICATIONS

U.S. Appl. No. 13/165,519, Notice of Allowance mailed May 15, 2013; 8 pages.
U.S. Appl. No. 13/165,519, Response to Office Action filed Apr. 17, 2013, 7 pages.
U.S. Appl. No. 13/165,519, Office Action mailed Jan. 17, 2013, 7 pages.

*Primary Examiner* — Yvonne Abbott
(74) *Attorney, Agent, or Firm* — Lathrop & Gage LLP

(57) ABSTRACT

An animal feeding system for slowing the eating process of an animal, e.g., a dog, and simultaneously entertains the animal. The animal feeding system includes a floor, retaining walls, and obstacles which form a food maze. The obstacles may vary, for example, in shape (e.g., as letters, words, geometric shapes, etc.), form (e.g., rigid structure, flexible fingers, etc.), size, height, etc. In addition, the obstacles may include structures to further slow an animal's eating, such as tunnels, slides, ramps, etc. The animal feeding system may be fabricated of any appropriate material, including, but not limited to, silicone rubber, natural rubber, metal, and ceramic.

21 Claims, 4 Drawing Sheets

PET FEEDING SYSTEM

RELATED APPLICATIONS

This application is a continuation of U.S. application Ser. No. 13/165,519, filed Jun. 21, 2011, which claims benefit of priority to U.S. Provisional Application Ser. No. 61/356,807, filed Jun. 21, 2010. Each of the above-mentioned applications is incorporated herein by reference.

BACKGROUND

This invention relates to a pet feeding system, specifically to a feeding mat, bowl or tray for slowing a pet's eating while simultaneously engaging and entertaining the pet.

The un-domesticated ancestor of the modern dog had to expend a considerable amount of energy to obtain a meal. In comparison, today's domestic dogs typically are fed a bowl of food twice a day, and eat their food in less than a minute. When a dog eats too fast its stomach may become 'bloated,' which can lead to dangerous or even deadly medical conditions.

There are feeding toys and bowls on the market for slowing a dog's eating, although both the toys and the bowls have drawbacks. First, rubber toys such as the Kong® are meant to hold soft and sticky food, such as canned dog food, peanut butter and the like. The Kong® and similar toys meant for holding wet food have too large an opening to contain dry food. In contrast, plastic food dispensers such as the Talk to Me Treat Ball®, the Clix Dog Pyramid® and the Buster Cube® have a small opening for holding dry food, with internal channels for accommodating the dry food. Wet, sticky food would be inaccessible to a dog, if placed inside such a dispenser. Furthermore, it would be difficult, if not impossible, to properly clean the wet food from the dispenser Toy food dispensers, like the Buster Cube®, the CLIX Dog Pyramid® and the Talk To Me Treat Ball® can also make a lot of noise when a dog bounces them around in an attempt to access the food inside. Also, these feeding toys can create a mess in the home when food and crumbs are left behind as a dog rolls the toy around to get the food out.

SUMMARY OF THE INVENTION

A feeding system that overcomes the drawbacks stated above is disclosed, and methods of using the pet feeding system are also disclosed herein.

In an embodiment, the pet feeding system may include a structure (also referred to as "a food holding structure") having a floor. The system may also include a plurality of obstacles arranged such that the obstacles and the spaces between the obstacles form a maze (also referred to as "food maze"). The food maze may help slow a pet's eating and may also entertain the pet. The obstacles may form one or more spaces within an obstacle or between two or more obstacles. Pet food may be placed in those spaces such that a pet has to find and gain access to the food. In another embodiment, the structure may further include at least one retaining wall.

In an embodiment, a pet feeding mat includes a floor and surrounding retaining walls, a plurality of obstacles extending from the floor or the walls to form a maze for holding pet food placed on the mat.

DETAILED DESCRIPTION OF THE FIGURES

The pet feeding system of the present invention is a stationary feeding system formed, for example, as a tray, a mat or similar food holding structure that includes a food maze for use in an animal's feeding area. The pet feeding system holds a measured amount of food (e.g., a cup of dog food) within the food maze's retaining walls and plurality of obstacles. Retaining walls assist in containing food within the pet feeding system to maintain a cleaner eating area. No canned food is necessary to hold dry food in place, as is the case with some conventional feeding toys. The obstacles, which may be formed for example as text and/or geometric shapes, cooperate to create a food maze. Pet food may be dispersed throughout the food maze (see FIG. 1), for example, in a space within an obstacle or in a space formed between two or more obstacles. Because a pet must find the food, the pet's eating rate is significantly slowed down.

Figure 1:
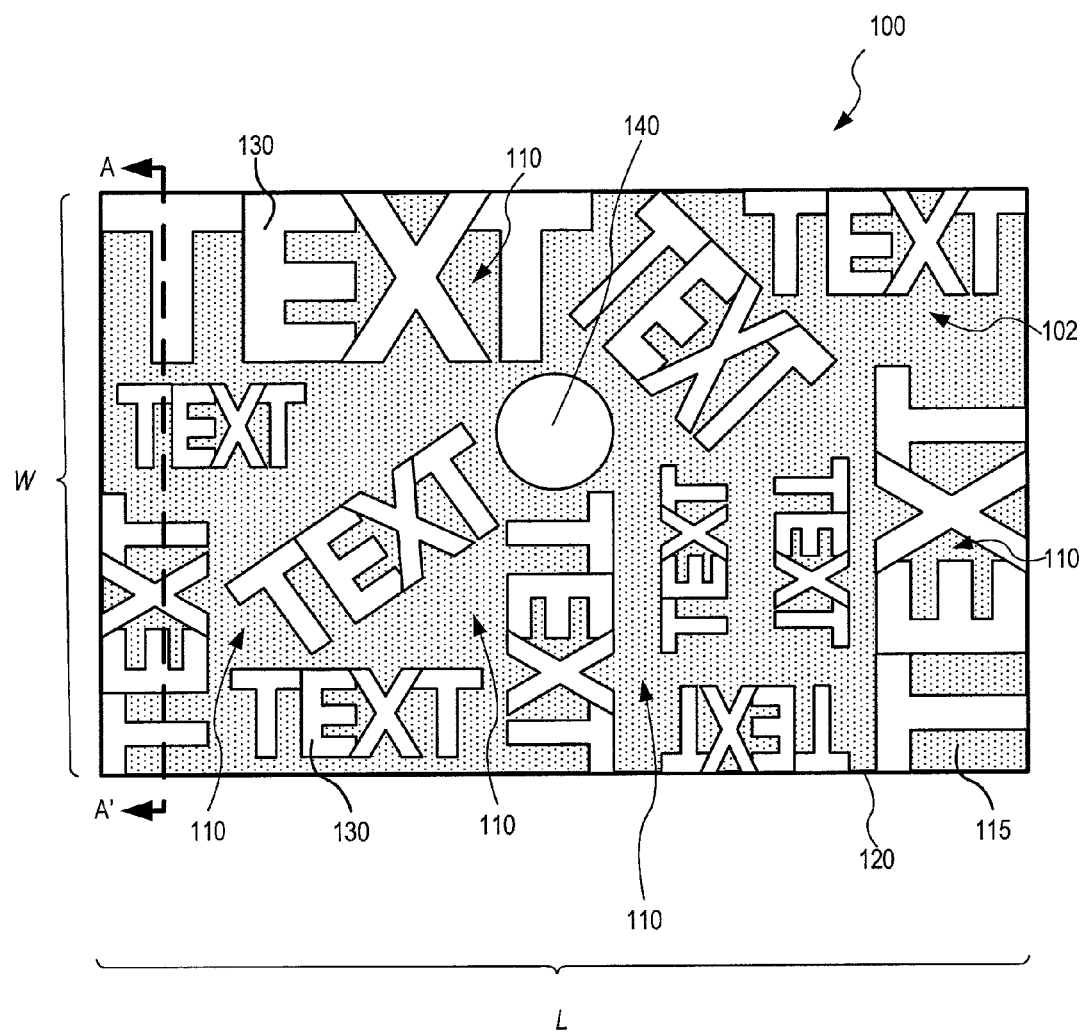
FIG. 1 is a top view of one exemplary pet feeding system including a food maze for slowing a pet's eating, according to an embodiment.
Figure 2:
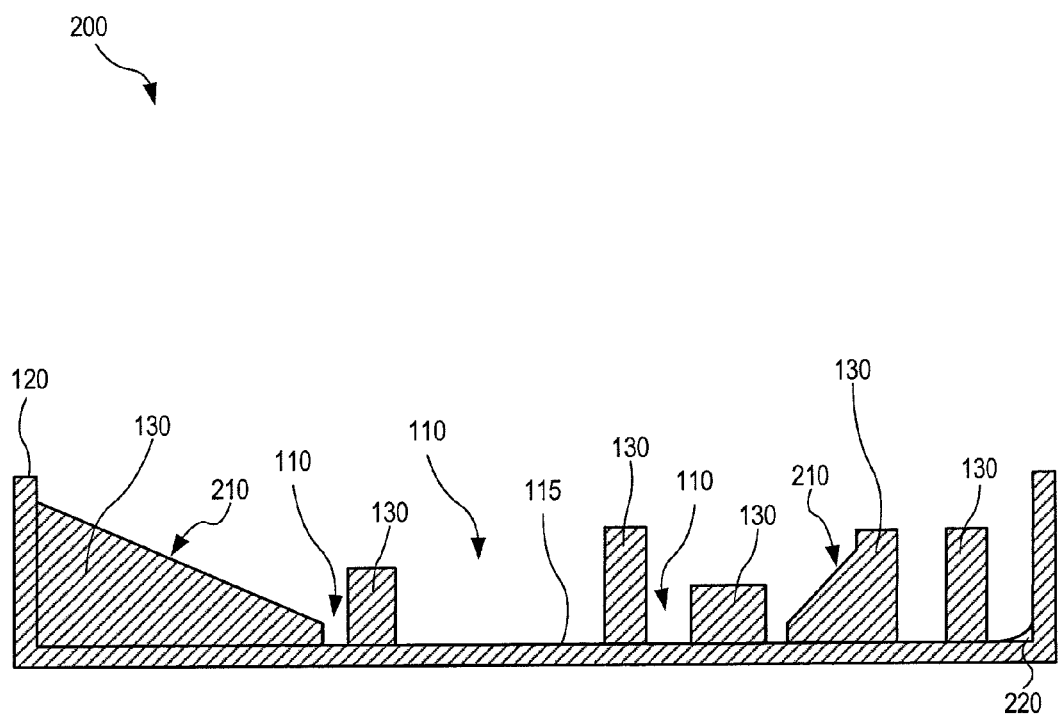
FIG. 2 is a cross sectional view of the pet feeding system of FIG. 1.
Figure 3:
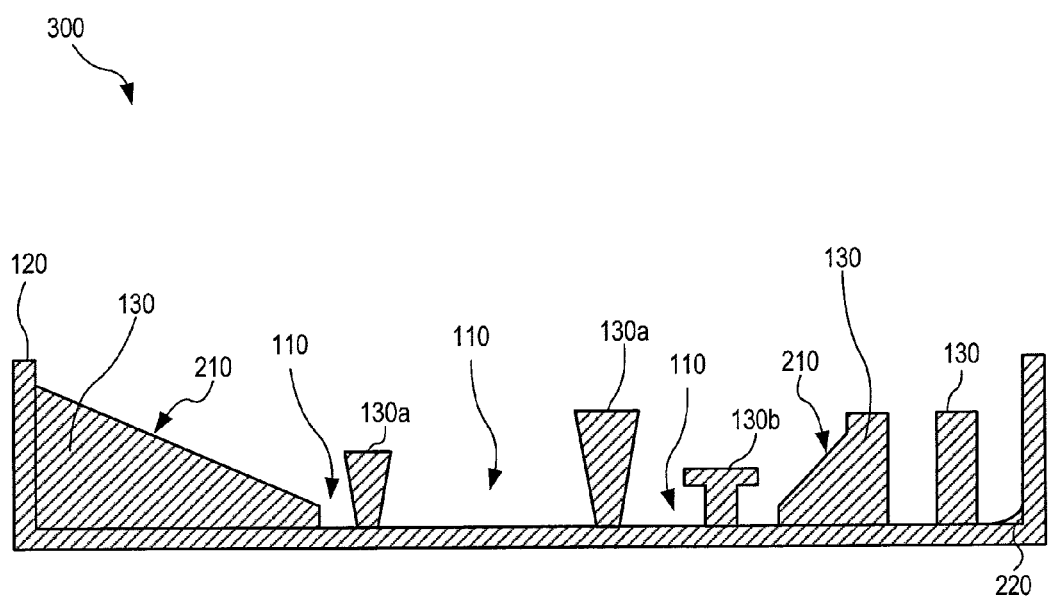
FIG. 3 is cross sectional view of one exemplary pet feeding system including a food maze formed with undercut obstacles, according to an embodiment.
Figure 4:
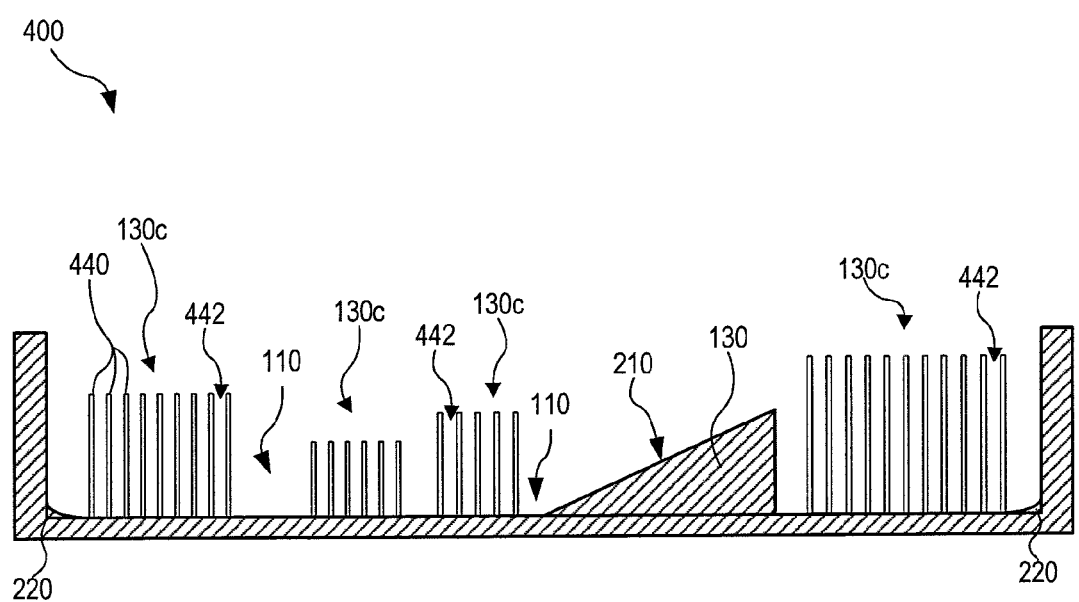
FIG. 4 is a cross sectional view of one exemplary pet feeding system including a food maze formed with flexible fingers, according to an embodiment.

In one embodiment, some or all of the plurality of obstacles are shaped to make both finding the pet food and retrieving the pet food more difficult for the pet, thereby further slowing the pet's eating rate (see FIGS. 2, 3 and 4). The feeding system may be configured to resist movement about the pets feeding area, for example, it may be weighted, or it may include a re-usable adhesive on a bottom surface, to anchor the feeding system to the floor or other surface on which the animal is fed. The bottom surface of the pet feeding system (e.g., the surface of the pet feeding systems that contacts a surface of the pet feeding area, such as a kitchen floor) optionally includes a texture or features to help the mat "grab" the floor and prevent sliding and movement of the mat while the animal is eating. The stationary nature of the pet feeding system reduces overall eating noise, compared with a conventional rolling or bouncing feeding toy that a pet chases. Although the pet feeding system is described in some examples in reference to dogs, it will be appreciated that it is not limited to use for dogs, and that other animals may benefit from the inventions disclosed herein. Accordingly, the disclosed pet feeding system may be manufactured in a variety of sizes to accommodate the needs of specific animals. In addition, it will be further appreciated that the present feeding system may be utilized for non-pet animals, for example, zoo animals. In such an embodiment, maze structures and feeding obstacles may be varied to accommodate the specific foods and food accessing means particular to an animal (e.g., a monkey's fingers, an anteaters tongue, a birds beak, etc.). Also, an animal feeding system may be constructed from material different from those directly disclosed herein, for example when increased durability is required (e.g., to protect against puncturing by teeth or damage due to an animal's strength), or to more closely approximate specific animals naturally occurring feeding obstacle (e.g., formed from wood or faux wood, stone, faux stone, faux grass, etc.). In another embodiment, the disclosed feeding system may be manufactured as a child food maze such that a child may use his/her hand or fingers to navigate the food maze to find food, e.g., Cheerios (R), M&M's (R). A child food maze may be used to slow a child's eating rate. In addition, the child food maze may be used to entertain the child, develop motor skills, and develop problem solving skills FIG. 1 is an illustrated top view of one exemplary pet feeding system 100, including a food maze 102. System 100 may be formed as a mat. In the example of FIG. 1, a floor 115 and retaining walls 120 form a rectangular structure of the pet feeding system 100, although the pet feeding system of the present invention may be formed as any geometric shape or representative shape (e.g., a dog bone shape), without departing from the scope herein. In the example of FIG. 1, system 100 includes a plurality of obstacles 130 that form text when viewed from above. A more playful text, e.g., "bubblegum," bubble or wrought iron text, or any other desired shape, size or orientation of text, may also be used to form obstacles 130. Optionally or additionally, obstacles 130 form shapes or graphics such as stars, doggie bones or any other shape when viewed from the top. Obstacles 130 may take any shape or combination of shapes that yields a pet food maze, wherein the maze "difficulty" may be based upon the breed and/or size of the animal. Obstacles 130 are positioned in different horizontal, vertical and diagonal orientations to produce a three dimensional food maze (e.g., the pet food is pushed along floor 115 between or beside obstacles 130 and/or retaining walls 120 as the pet eats). Such a food maze may include features such as channels, zigzags, small and larger cavities (e.g., formed from spaces 110 between obstacles 130), one or more integrated bowls or cups (e.g., bowl or cup-shaped recess 140), and tunnels (not shown) which increase the challenge of eating and thereby slowing the pet's eating rate. Spaces 110 between obstacles 130 are sized to accommodate at least the pet's tongue, and optionally the pet's snout. In one aspect, system 100 has a length (L) of about 24 inches and a width (W) of about 12 inches; however, system 100 dimensions may vary according to the type and size of pet and intended use and/or design preference.

A skyline style food maze may be produced by forming obstacles 130 having differing heights, as shown in FIG. 2. The skyline style food maze may further include third dimensional features, for example, angled features such as ramps and slides (210, FIG. 2), such that food may be moved in a third dimension (e.g., up a ramp or down a slide), providing an additional challenge, further challenging the pet and slowing the pet's eating rate.

A system of the present disclosure may optionally contain one or more systems 100. For example, two systems 100 may be joined side-by-side or may be stacked one atop the other, such that systems 100 at least partially overlap. In one aspect, one or more edges of system 100 include cut-outs or extensions that fit with complimentary features of a second system 100, such that the two systems 100 interlock like two puzzle pieces. Such combinations add complexity and create a greater eating challenge to further increase the pet's eating time. Additionally, combining two or more pet feeding systems 100 increases the holding capacity of the pet feeding system, for example, increasing capacity from one cup to two cups. Also, food contained within one system 100 may be isolated from food contained within a connected system 100 (i.e., food from one system 100 does not move to the other system 100). In one embodiment, systems 100 may connect to form channels or other passageways between the mats, allowing movement of food between connected mats. For example obstacles 130 may be shaped as ramps and slides (see, e.g., ramp 210, FIG. 2) proximate an edge of one or more connected systems 100 to facilitate movement of food over retaining walls 120 by the pet. In another example, holes and tunnels through retaining walls 120 and floor 115 facilitate movement of food between connected mats by the pet.

In an embodiment, the system may be formed without retaining walls, such that food may be moved out of system 100. In an embodiment, the system may contain one or more retaining walls 120, which may removably attach to floor 115. The one or more retaining walls 120 may be removed to expose one or more connectors (not shown) such as one or more interlocking features (e.g., puzzle-piece edges), hook and loop fasteners (e.g., Velcro), snaps or any other connecting means known in the art, to connect systems 100 together. In one embodiment, at least one edge of system 100 includes a channel configured to fit a rail of a second system 100 (e.g., a rail carved, molded or extruded into a bottom edge of second system 100).

System 100 may accommodate either dry food (e.g., within the food maze formed by the retaining walls 120 and obstacles 130) or wet food (e.g., within one or more bowls or cups, such as cup 140 included in floor 115 or included within an obstacle 130 of system 100), or both. Cup 140 may be formed as recesses in floor 115 of system 100, as shown, or as recesses in one or more obstacles 130 (not shown). Cup 140 may for example form part or all of a design or punctuation mark (e.g., a polka-dot, the center portion of a flower, or the dot of an exclamation mark following text formed by system 100 features). In one embodiment, cup 140 may include a hinged, pop-on or other manner of cover that can be opened or removed to add soft food or other treats, as desired.

In one embodiment, system 100 is fabricated from a dishwasher safe material, such as rubber, silicone rubber, or any other food safe, puncture resistant material known in the art. System 100 may optionally include or be manufactured from dishwasher-safe and animal-safe metal, plastic or polymer material. System 100 may be made of a soft yet durable, puncture-resistant and animal-safe material, for example, natural rubber. System 100 may be sized to fit inside a standard dishwasher or fabricated from component parts that fit inside the dishwasher when disassembled. System 100 therefore presents an important advantage over conventional treat toys and feeding devices, which cannot be properly cleaned and are therefore non-hygienic. In addition, system 100 is gentle on a pet's nose or snout, for example, made with rounded edges and/or fabricated from flexible or semi-flexible material. System 100 may be manufactured in a variety of colors and color combinations, to compliment the dècor of a pet feeding area.

FIG. 2 illustrates one exemplary cross-sectional view 200 A-A' of pet feeding system 100 of FIG. 1. As shown in FIG. 2, obstacles 130 have varying heights. Obstacles 130 may also take the form of, or include, ramps 210, adding a further dimension to the pet's eating experience. Food slides or rolls down or up ramps 210 as it is pushed by the pet's snout or tongue. Ramps 210 may be flat across their surfaces or be formed with food retaining grooves or slides (not shown) running lengthwise or otherwise oriented along the ramp. Optionally, a tunnel (not shown) formed within or by, one or more of obstacle 130 and ramp 210, adds further complexity and "chase" to a pet's eating experience, slowing overall eating.

Retaining wall 120 is shown with an optional curved, interior corner 220. Curved corner 220 reduces incidence of lodged food, as opposed to angular corners, and provides a more easily accessible surface, to facilitate cleaning of system 100. Curved corner 220 may be formed in any or all corners of system 100.

FIG. 3 illustrates another exemplary cross-sectional view 300, similar to view 200 of FIG. 2, showing optional characteristics of obstacles 130*a* and 130*b*. Obstacles 130*a* are tapered obstacles (e.g., a truncated cone or a truncated pyramid) that are smaller at their base than at their top. Obstacle 130*b* is an extruded T-shaped obstacle. Obstacles 130*a* and 130*b* increase the difficulty of accessing food in system 100, thereby further slowing a pet's eating time and adding a dimension of chase to the pet's eating experience.

In an embodiment, obstacles 130*a* and/or 130*b* may be substantially ridged, such that a pet has to work around them to access food.

In a separate embodiment, obstacles 130*a* and/or 130*b* may be flexible such that a pet may bend them to access food.

In yet another embodiment, obstacles 130*a* and/or 130*b* may be formed as a combination of flexible and rigid obstacles.

Obstacles 130, 130*a* and 130*b* are shown with specific shapes in FIGS. 2 and 3. It will be appreciated that shapes and configurations of obstacles 130, 130*a* and 130*b* may be selected from a wide variety of geometric shapes or formed from or in any combination of shapes.

FIG. 4 illustrates another example of a cross-sectional view 400 through pet feeding system 100 of FIG. 1, taken through the line A-A' and shows alternate/additional obstacle configuration. View 400 is similar to view 200, with some obstacles 130 replaced with obstacles 130*c* that are each formed from a plurality of flexible fingers 440 with spaces 442 between the fingers. Spaces 442 hold or temporarily trap food, adding another challenge for a pet attempting to access and eat food, to further engage the pet and increase the pet's eating time.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. An animal feeding system comprising:
    a one-piece mat having:
        a floor; and
        a plurality of obstacles formed with and extending upward from said floor to form space for holding animal food;
        wherein the mat is configured to remain stationary relative to a supporting surface; and
        wherein the obstacles are gentle on an animal's nose or snout.

2. The animal feeding system of claim 1, wherein the structure further comprises at least one retaining wall for containing animal food within the animal feeding system.

3. The animal feeding system of claim 2, wherein the at least one retaining wall comprises two or more retaining walls.

4. The animal feeding system of claim 3, wherein the two or more retaining walls are joined to form at least one curved, interior corner.

5. The animal feeding system of claim 2, wherein the at least one retaining wall extends from the floor to form a curved, interior corner.

6. The animal feeding system of claim 1, further including an integrated cup for holding water or wet food.

7. The animal feeding system of claim 6, wherein the integrated cup is formed within one of the plurality of obstacles.

8. The animal feeding system of claim 1, wherein the obstacles vary in height.

9. The animal feeding system of claim 1, wherein the obstacles include one or both of a slide and a ramp configured with and extending from the floor at an angle of greater than ninety degrees.

10. The animal feeding system of claim 1, wherein the animal feeding system is fabricated from a dishwasher safe material.

11. The animal feeding system of claim 10, the dishwasher safe material comprising one or more of silicon rubber, natural rubber and rubber blends.

12. The system of claim 1, wherein the obstacles form a maze.

13. The animal feeding system of claim 1, wherein the obstacles form one or more of tunnels, grooves, and bowls.

14. The animal feeding system of claim 1, wherein the floor includes a cup shaped recess.

15. The animal feeding system of claim 1, wherein the animal feeding system is formed to hold a measured amount of animal food.

16. The animal feeding system of claim 1, wherein a bottom surface of the floor is configured to be non-slip to prevent movement of the animal feeding system when an animal eats.

17. The animal feeding system of claim 1, wherein the space for holding animal food is sized to accommodate the snout of an animal.

18. The animal feeding system of claim 1, wherein a height of the plurality of obstacles is sized to accommodate the snout of a specific animal.

19. The animal feeding system of claim 1, wherein the obstacles and the structure are formed with rounded edges.

20. The animal feeding system of claim 1, wherein the space for holding animal food is sized to accommodate an animal's tongue.

21. The animal feeding system of claim 1, wherein the floor and the plurality of obstacles are formed together to create one continuous surface.

* * * * *